United States Patent [19]

van der Lely

[11] 4,263,974
[45] Apr. 28, 1981

[54] SOIL CULTIVATING MACHINES

[76] Inventor: Cornelis van der Lely, 7, Brüschenrain, Zug, Switzerland

[21] Appl. No.: 51,124

[22] Filed: Jun. 22, 1979

[30] Foreign Application Priority Data

Jun. 22, 1978 [NL] Netherlands ............... 7806738

[51] Int. Cl.³ .................. A01B 33/06; A01B 33/16
[52] U.S. Cl. ......................... 172/47; 172/68;
172/177; 172/179; 172/421; 172/443; 172/532;
172/552; 172/558; 172/610
[58] Field of Search ............... 172/68, 47, 59, 69,
172/149, 150, 151, 169, 170, 173, 175, 177, 179,
421, 443, 532, 552, 121, 558, 559, 561, 610;
238/272, 273, 63; 403/346, 347

[56] References Cited

U.S. PATENT DOCUMENTS

| 26,100 | 11/1859 | Tompkins | 404/132 |
|---|---|---|---|
| 112,149 | 2/1871 | Keagy | 172/172 |
| 594,238 | 11/1897 | Fisher | 404/132 |
| 1,397,391 | 11/1921 | Adams | 172/552 X |
| 1,545,564 | 7/1925 | Krotz | 172/179 |
| 1,645,994 | 10/1927 | Lloyd | 172/179 |
| 1,743,151 | 1/1930 | Malepsy | 172/532 |
| 2,276,391 | 3/1942 | Hathorn | 403/346 |
| 3,616,862 | 11/1971 | Lely | 172/47 |
| 3,835,533 | 9/1974 | Coski | 172/508 X |
| 3,876,013 | 4/1975 | Dunn | 172/150 X |
| 4,029,153 | 6/1977 | Lely | 172/59 |
| 4,090,569 | 5/1978 | Lely | 172/68 X |

FOREIGN PATENT DOCUMENTS

| 880814 | 6/1953 | Fed. Rep. of Germany | 172/532 |
|---|---|---|---|
| 1187840 | 2/1965 | Fed. Rep. of Germany | 172/552 |
| 30644 | 4/1920 | Norway | 404/132 |

OTHER PUBLICATIONS

Lely Terra Rotary Harrow Operators Manual & Parts List Type 350-30 and 400-30, pp. 012 & 013. 11-1977.

Primary Examiner—Paul E. Shapiro
Attorney, Agent, or Firm—William B. Mason

[57] ABSTRACT

A soil cultivating machine has a row of cultivating members journalled in an elongated frame portion. The rear of the machine is supported by elongated rollers positioned side-by-side and pivotable arms interconnect the lateral roller ends to rear plates on the frame portion. The arms and working level of the rollers are settable and beam supports extend from the plates upwardly and forwardly to an apex connection to a trestle top. The trestle is a coupling with points connectable to the three point lift of a tractor.

11 Claims, 11 Drawing Figures

SOIL CULTIVATING MACHINES

In known soil cultivating machine having a frame supported by at least one roller and accommodating a plurality of cultivating members adapted to rotate about upwardly extending axes, and which have a large working width, difficulties often arise in ensuring a reliable support by the roller.

According to the present invention there is provided a soil cultivating machine comprising a frame supported by a roller and accommodating a plurality of cultivating members adapted to rotate about upwardly extending axes, the frame being provided with a frame portion to the rear of which with respect to the intended direction of operative travel of the machine are fastened supporting parts for the roller, these parts having also fastened to them a beam which is connected with a part of the frame located at a higher level than said frame portion.

With machines having a large working width the construction just defined can provide a reliable support for the frame because the support by means of the roller need not be limited to the ends of the frame portion carrying the cultivating members, since between these ends an effective support can be provided so that the large distance between the ends of the frame can be effectively bridged for supporting the frame.

For a better understanding of the invention and to show how the same may be carried into effect reference will now be made, by way of example, to the accompanying drawings, in which.

Figure 1:
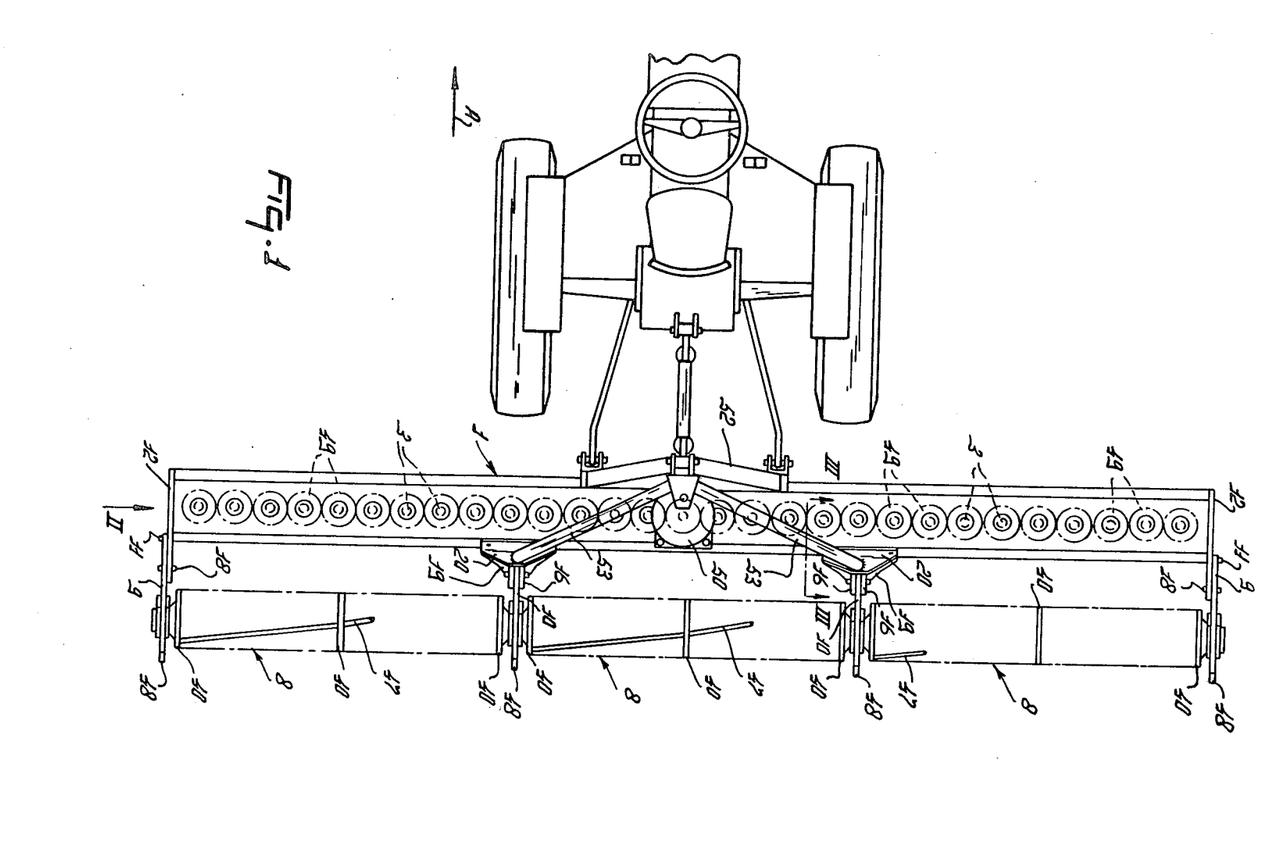
FIG. 1 is a schematic plan view of a first form of soil cultivating machine.
Figure 2:
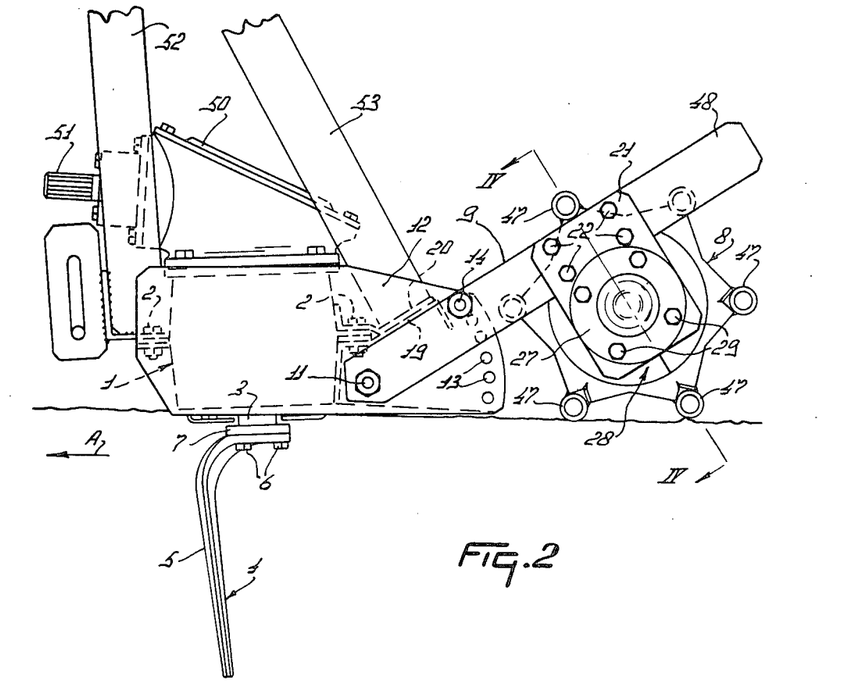
FIG. 2 is a side view of the machine of FIG. 1, taken in the direction of arrow II in FIG. 1 and drawn to a larger scale.
Figure 3:
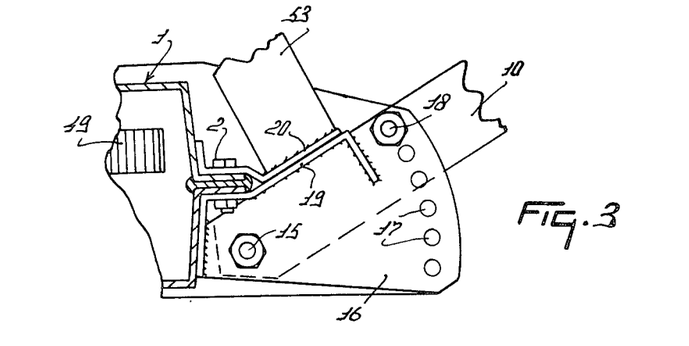
FIG. 3 is a sectional side view, on a still larger scale, taken on line III—III in FIG. 1.

The soil cultivating machine illustrated in FIGS. 1 to 9 has a hollow frame portion 1 extending transversely of the intended direction of operative travel A of the machine and made-up of two identical parts clamped together along longitudinal rims. Packing material is sandwiched between these longitudinal rims and the parts are clamped together by bolts 2. The frame portion 1 supports substantially vertical shafts 3, forming parts of cultivating members 4. The longitudinal center lines of the shafts 3 are preferably spaced apart by a distance of 15 centimeters and during operation they are slightly inclined forward, preferably at an angle of about 5° to the vertical. Each of the cultivating members 4 is provided with only one tine 5, which is fastened by means of bolts 6 to a carrier 7 located at the lower end of the shaft 2 which projects out of the frame portion 1. Behind the cultivating members 4 there are three supporting members 8 in the form of rollers, which have identical structures and are supported in a pivotable manner with respect to the frame portion 1 by means of arms 9 and 10 with one arm 9 at each end of the frame portion 1 and the two arms 10 intermediate the arms 9. Each arm 9, 10 is pivotable and can be fixed in a selected one of a plurality of positions with respect of the frame portion 1. The outermost arms 9 are pivoted by means of bolts 11 directly behind the lower part of the frame portion 1 to upwardly directed plates 12 extending in the direction of travel A and closing the ends of the frame portion. The plates 12 extend beyond the rear of the frame portion 1 and each has near its rear edge a row of holes 13 located on the arc of a circle having its center on the longitudinal center line of the bolt 11 (FIG. 2). By means of a bolt 14, which can be passed through a hole in an arm 9 and through a selected one of the row of holes 13, each arm 9 can be set in position. The arms 10, located between the ends of the frame portion 1 and supporting the proximal ends of the respective rollers 8, are pivoted by bolts 15, whose longitudinal center lines are in line with those of the bolts 11, between upwardly extending plates 16 (FIG. 3). Near the rear edge of each plate 16 there is a row of holes 17 located on the arc of a circle having its center on the longitudinal center line of the bolt 15. Through a hole in the arm 10 and any one of the holes 17 a bolt 18 can be passed to set the arm 10 in position with respect to the frame portion 1. Each plate 16 is secured to a support 19 which is clamped by means of the bolts 2 against the lower part of the frame portion 1. The top of each plate 16 and each support 19 is in engagement with a plate 20 of substantially triangular shape, viewed in plan, which is clamped by the bolts 2 against the upper part of the frame portion 1.

Figure 4:
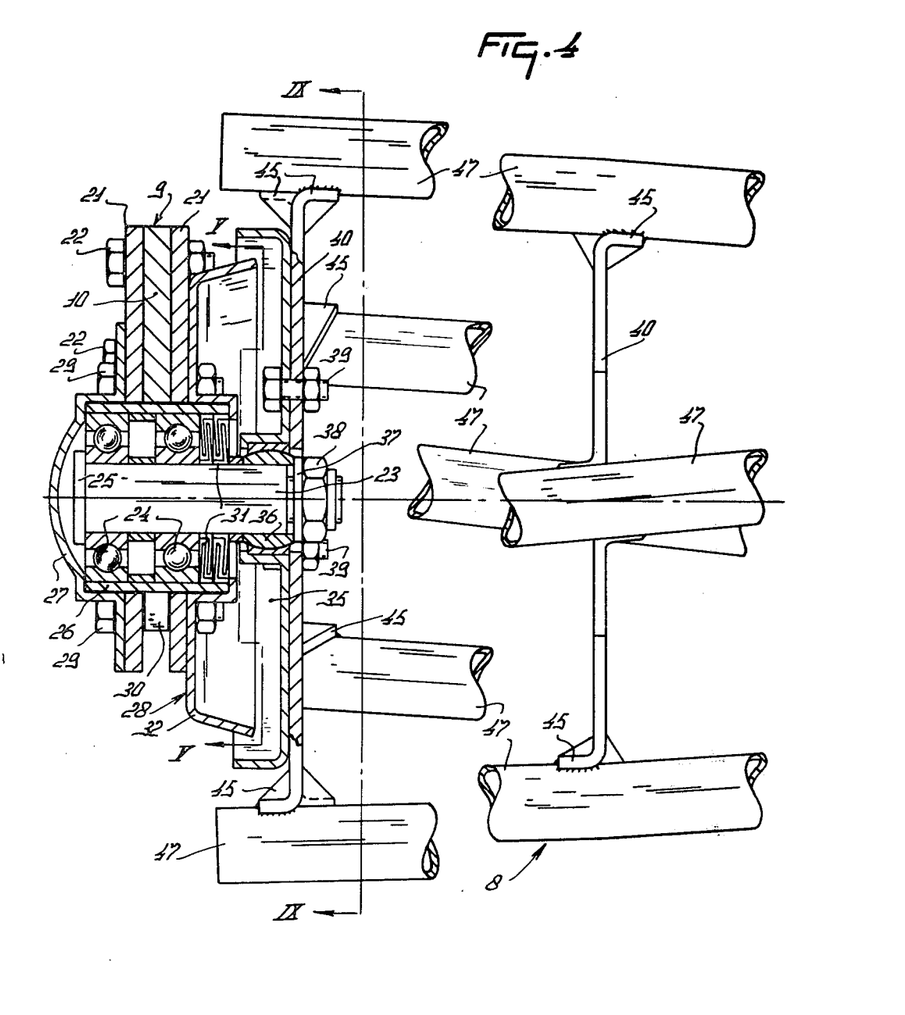
FIG. 4 is a sectional side view taken, on a larger scale, on the line IV—IV in FIG. 2.
Figure 5:
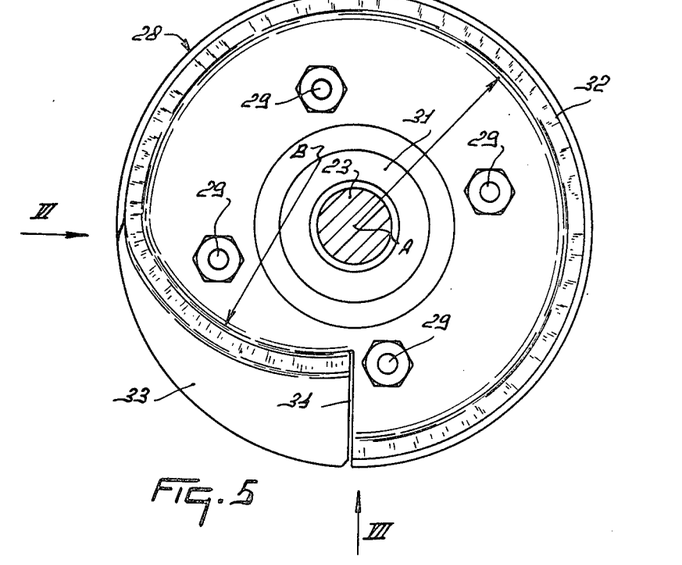
FIG. 5 is a sectional side view taken on line V—V in FIG. 4.
Figure 6:
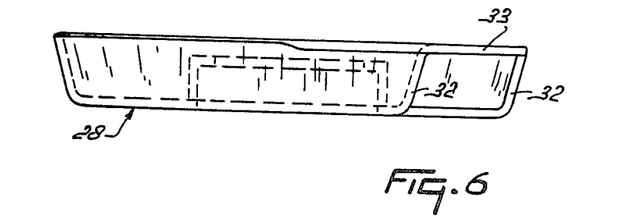
FIG. 6 is a view in the direction of arrow VI in FIG. 5.
Figure 7:
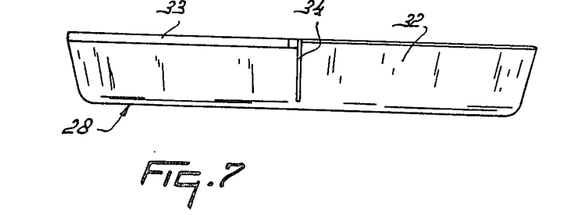
FIG. 7 is a view in the direction of arrow VII in FIG. 5.

Each of the arms 9 and 10 has just behind its center downwardly extending plates 21 which are substantially at right angles to the arm and which are secured in place on both sides of the arm (FIGS. 2, 4 and 8) by means of bolts 22. The plates 21 on each outermost arm 9 carry a stub shaft 23 supported in two relatively spaced ball bearings 24, the outermost of which bears on a shoulder 25 of the stub shaft. These bearings are accommodated in a bearing housing 26 which is held in aligned apertures in the plates 21 and the arm 9. The bearing housing 26 is held in place with respect to the plates 21 by means of a dust cap 27 at the outboard end of the stub shaft 23, and by being located in a recess in a screening hood 28 located on the roller side. The dust cap 27 as well as the screening hood 28 are held in place by means of bolts 29, which also serve to secure in place spacer sleeves 30 located between the plates 21. On the side of the screening hood 28 the bearing housing 26 is closed by a labyrinth seal 31. The recess in the screening hood 28 for holding the bearing housing 26 is located concentrically with the aperture for the stub shaft 23. Around this recess the wall of the screening hood 28 has a profile 32 which extends concentrically with the recess through 270° from an outer end and then inwardly along another circular arc through about 90°, the center of this arc being spaced from the center of the recess so that the profile terminates at an inner end located on the same radial line as the outer end with the two ends spaced apart from one another by a distance equal to about one quarter of the outside diameter of the screening hood (FIG. 5). The wall having the profile 32 has an outwardly inclined, bent-over rim. The portion 33 defined between the inwardly curved part of the wall having the profile 32 and the outermost periphery of the screening hood 28 as a whole is flat and is located at the level of the free edge of the bent-over rim (FIG. 6). The radially extending front edge 34 of this portion 33 constitutes a scraping element, the function of which will be explained hereinafter.

Figure 9:
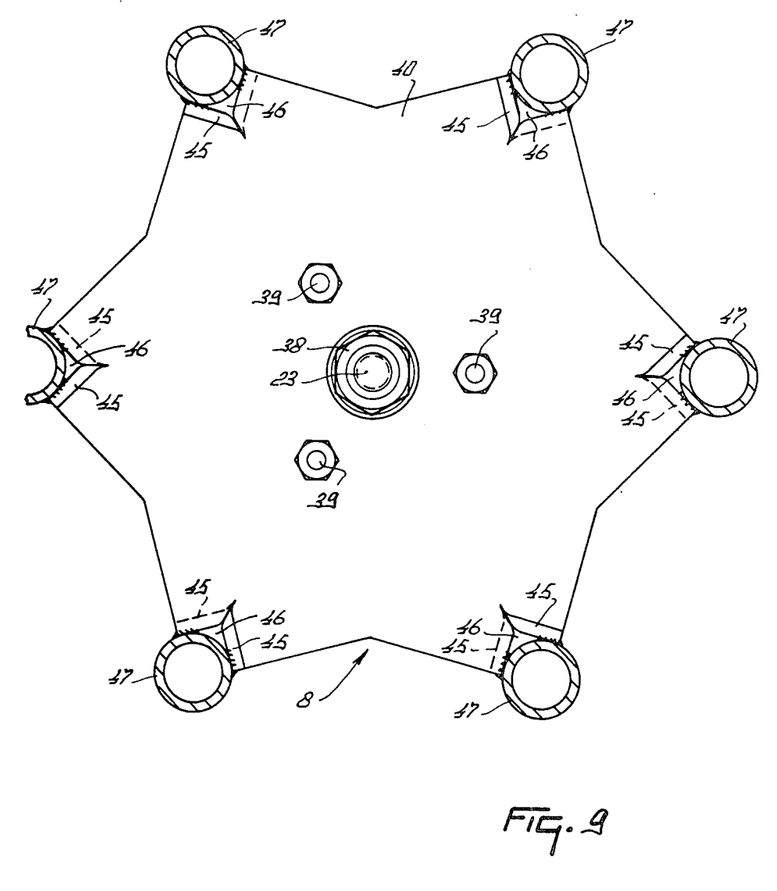
FIG. 9 is a sectional view taken on line IX—IX in FIG. 4.

The wall having the profile 32 extends inside the rim of a screen 35, which rim is bent over substantially at right angles to the remainder of this screen. The screen 35 has a recess at its center accommodating a bearing 36, formed by a ball-and-socket joint, on the stub shaft 23. A closing plate 37 for guarding the assembly of ball bearings 24 and the bearing 36 is held in place on the bearing 36 by a nut 38 co-operating with a screw-thread on the inboard end of the stub shaft 23. The screen 35 is fastened by means of bolts 39 to the outer side of a supporting plate 40 located near the outboard end of the roller 8. The plate 40 has the shape of a six-pointed star (FIG. 9).

Figure 8:
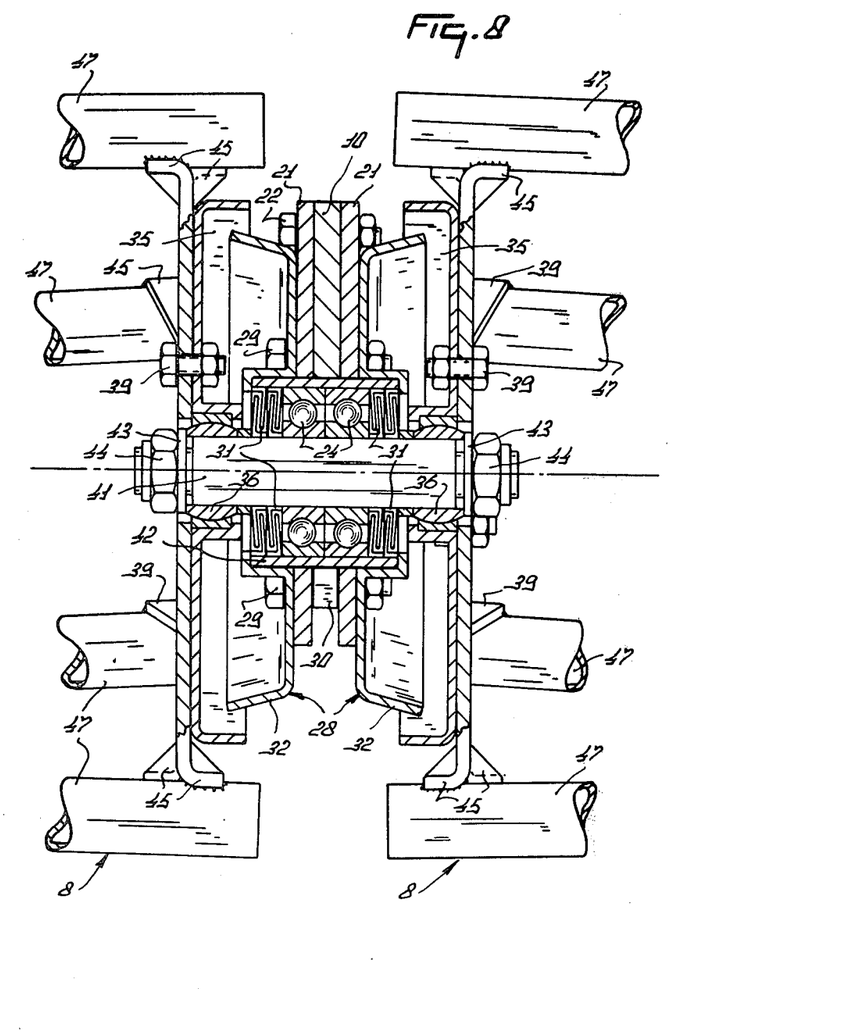
FIG. 8 shows on an enlarged scale and in section a bearing for the facing ends of two neighbouring rollers.

The plates 21 on the arms 10 for supporting the proximal ends of the rollers 8 hold, in the case of each arm 10, a single stub shaft 41 in two ball bearings 24 arranged in a bearing housing 42, which is held in place by means of screening hoods 28 on both sides of the supporting plates (FIG. 8). The bearing housing 42 is closed on each side by means of a labyrinth seal 31. On both sides of the bearing housing 42 the stub shaft 41 has a ball-and-socket joint bearing 26 for supporting one or other of the rollers 8 and in the same manner as for the stub shaft 23 this bearing 36 is accommodated in a screen 35, inside which is located the wall having the profile 32 of the respective screening hood 28. The respective bearings 24 and 36 are arranged on the stub shaft 41 between closing plates 43, which are held in place by means of nuts 44 co-operating with screwthreaded ends of the stub shaft 41.

Near its center each roller 8 has a further supporting plate 40 (FIG. 1). Each tip of each of the three star-shaped supporting plates 40 of each roller 8 is cut and the severed parts 45 are bent over at right angles in opposite senses (FIGS. 4, 8 and 9). The bent-over parts 45 thus provide V-shaped recesses 46 in which tubular, elongated elements 47 are secured around the circumference of the roller. Each tubular elongated element 47 runs along the length of the roller, with a slight kink near the center (FIGS. 1 and 4) so that the elements are disposed in substantially helical fashion around the circumference of the roller in the manner illustrated in the Figures. The parts 45 permit simple and easy fastening of the respective elongated elements by welding during manufacture.

Rearwardly projecting free ends 48 of the arms 9 and 10 supporting the rollers 8 serve as handles that can be used for displacing the rollers 8 in a direction of height so that setting the arms 9 and 10 in position is considerably facilitated.

Inside the hollow frame portion 1 each of the shafts 2 of the cultivating members 3 is provided with a pinion 49 with the pinions on the shafts of neighbouring cultivating members drivably in mesh with one another. The shaft 2 of the cultivating member 3 near the center of the machine is prolonged upwards into a gear box 50, in which it is linked through a bevel transmission (not shown) to a shaft 51 projecting from the front of the gear box and connectable through an auxiliary shaft with the power take-off shaft of a tractor.

At the front the frame portion 1 is provided near the center with a trestle 52 for attaching the machine to the three-point lifting device of a tractor. The top of the trestle 52 is provided with downwardly diverging supports 53, which are secured to the upper faces of the plates 20 so that an additional support for the central arms 10 is obtained.

The machine described above, having a working width of about 4.50 meters, operates as follows.

During operation the machine is hitched by means of the trestle 52 to the three-point lift of a tractor and from the power take-off shaft of the tractor the respective cultivating members 3 are driven through the transmission described above in a manner such that neighbouring cultivating members rotate in opposite senses. The tines 5 of neighbouring cultivating members work overlapping strips of soil. The effective depth of the cultivating members 3 can be set with the aid of the three rollers 8 disposed in a line transverse of the direction of operative travel A so as to be rotatable about a common transverse axis. For this purpose the arms 9 and 10, after removal of the bolts 14 and 18 respectively, can be moved about the hinge bolts 11 and 15 with the aid of the handles 48, in a direction of height, and can be fixed in the desired position with the aid of the bolts 14 and 18. The earth thrown to the rear by the cultivating members, the shafts of which, as stated above, are slightly inclined forward, is captured by the respective rollers 8 and evenly distributed, after which it is packed during deposition. During operation the bearings of the stub shafts 23 and 41 of the rollers 8 are protected against penetration of earth and the like, since the screening hoods 28 detach any material that may penetrate within with the aid of the scraping element formed by the front edge 34 of the portion 33, the scraping element co-operating with the adjacent roller end and material being conducted away along the guide formed by the inwardly curved profile out of the stationary screening hood.

Jamming of the rollers during operation is thus effectively avoided in a simple manner, even if the working conditions are such that the machine is soiling heavily.

Figure 10:
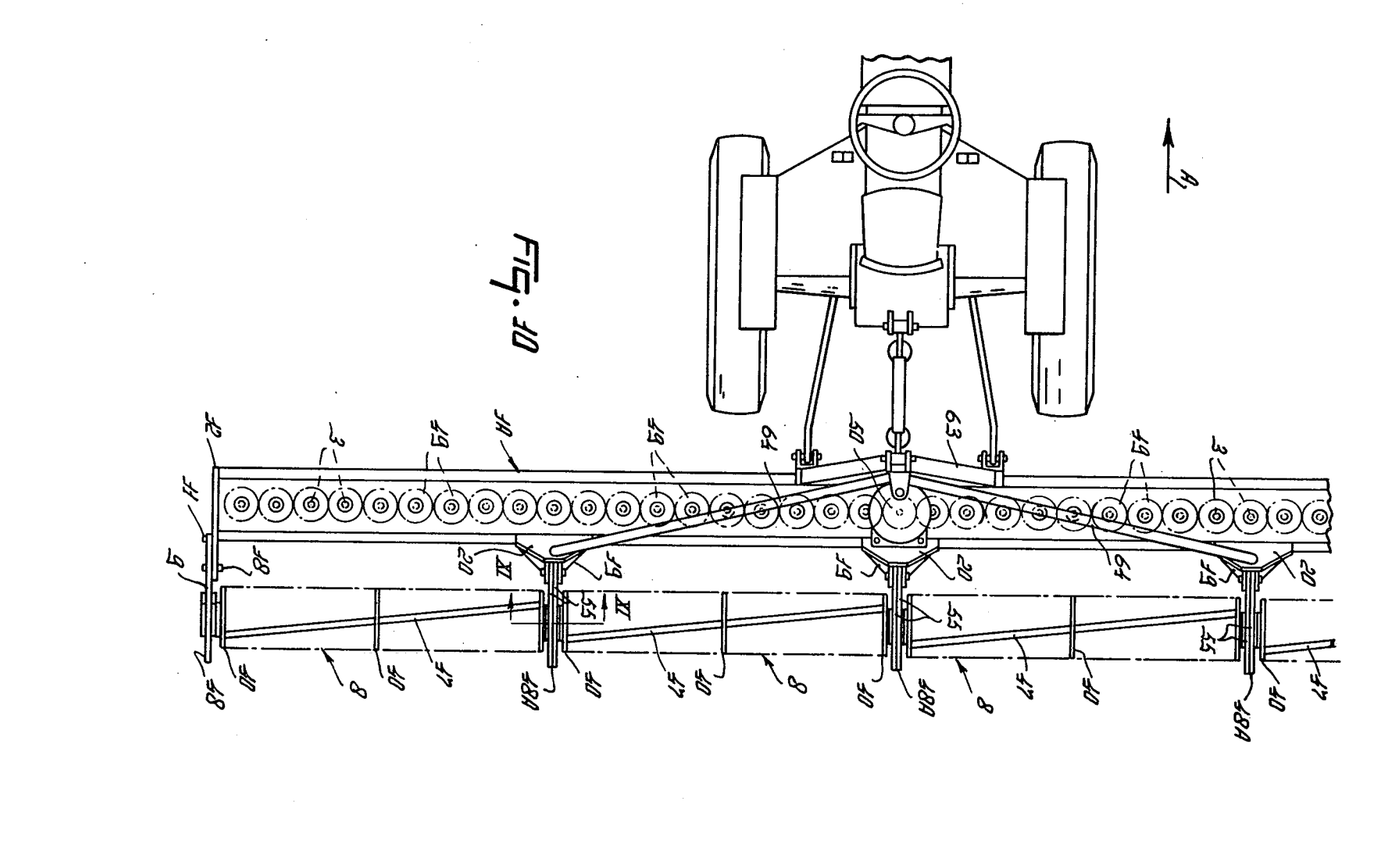
FIG. 10 is a schematic plan view of part of a second form of soil cultivating machine.
Figure 11:
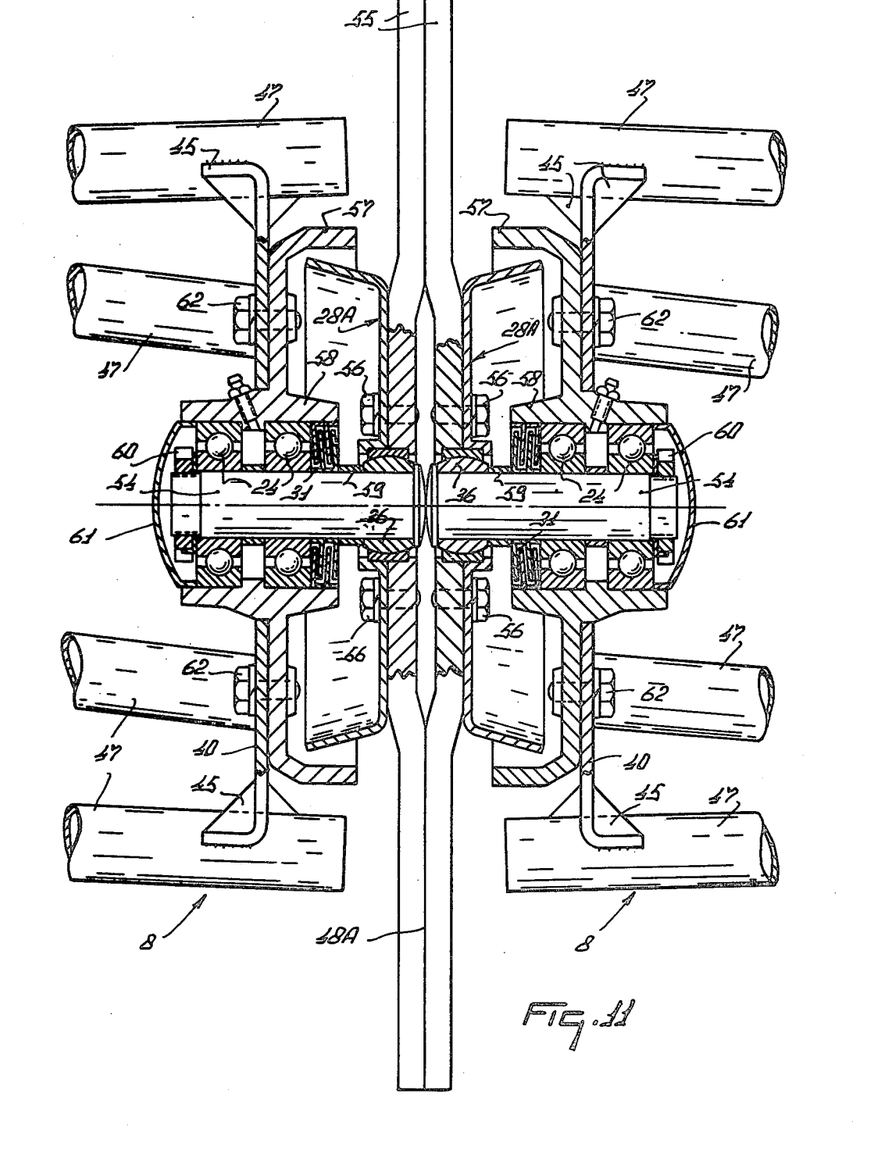
FIG. 11 shows on an enlarged scale and in section a bearing for the facing ends of two neighbouring rollers of the machine shown in FIG. 10.

The machine of FIG. 10 has a larger number of cultivating members 3 so as to have a working width of about 6 meters. With this machine four rollers 8 of the same design as those described above are arranged behind the cultivating members 3. The outermost arm 9 support in the same manner as described above the outermost ends of the outermost rollers. In this machine, however, the proximal ends of the rollers 8 are each supported by a separate stub shaft 54 and a separate arm 55 (FIG. 11). The arms 55 are in contact with one another and have a kink at the level of the stub shafts 54 so that a space is formed for the inter-engaging flange-shaped ends of the stub shafts. Each of the stub shafts 45 is supported by means of a ball-and-socket joint bearing 36 in aperture in one or other of the arms 55. The bearings 36 are held in place by means of bolts 56 on screening hoods 28A arranged on the arms. These screening hoods are designed substantially like the screening hoods 28 already described and they also have a scraping element. The wall profile of each screening hood 28A extends inside the bent-over rim of a cast iron screen 57 each of which has a bearing housing 58 accommodating relatively spaced ball bearings 24 on the respective stub shaft 54. The ball bearings 24 are separated by means of a spacer sleeve 59 from the respective ball joints 36 and are held in place by means of a nut 60 co-operating with the screwthreaded end of the stub shaft 54. Each nut 60 is covered by a dust cap 61 bearing on the adjacent ball bearing and extending into the bearing housing 58. The screens 57 are fastened by means of bolts 62 to the outermost supporting plate 40 of the respective roller. In this machine the frame portion 1A is provided with a trestle 63 for attaching the machine to the three-point lift of a tractor, this trestle being fastened by means of supports 64 to the top faces of the plates 20 for holding the supporting arms of the proximal ends of the outer and inner rollers 8. Also this machine has handles for the supporting arms 55, designated by reference numeral 48A.

Since in the two machines described the rotatable support at the proximal ends of the rollers comprises a hinge joint formed by the ball-and-socket joint bearing 36, the support provided by the rollers is flexible and the machine can satisfactorily match the ground surface.

The support of the respective rollers 8 illustrated in FIG. 11 imparts a higher load resistance to the rollers, which is important for a machine of this width.

In each machine each screening hood has a form such that material penetrating into the interior of the hood during operation is conducted out of the hood.

While various features of the soil cultivating machines that have been described, and that are illustrated in the drawings, will be set forth in the following claims as inventive features it is to be noted that the invention is not necessarily limited to these features and that it encompasses all of the features that have been described both individually and in various combinations.

I claim:

1. A soil cultivating machine comprising a frame, including an upwardly extending coupling trestle at the forward side thereof and cultivating means supported on a portion of said frame, elongated supporting roller means pivoted to said frame and positioned to the rear of said cultivating means, said roller means being interconnected to said frame by supporting parts comprising plate means positioned at the rear of said frame portion, between the lateral ends thereof, at least one upwardly and forwardly extending beam interconnecting said plate means to said trestle above said frame portion, said roller means being mounted on at least one supporting arm and a forward portion of said arm being pivoted to said plate means, said arm extending upwardly from a pivot connection to said plate means, rearwardly to a mounting for said roller means.

2. A soil cultivating machine as claimed in claim 1, wherein said roller means is pivoted to the frame by supporting arms on respective pivots to corresponding plate means, said plate means being fixed to said frame portion and each arm is pivotable in vertical directions about said pivots, setting means interconnecting the arms to said plate means in any one of a plurality of different working levels of said roller means.

3. A soil cultivating machine as claimed in claim 2, wherein said plate means comprises at least one plate assembly and said assembly includes a pair of spaced apart vertical plates and a flat plate that interconnects said vertical plates.

4. A soil cultivating machine as claimed in claim 3, wherein the supporting arm for the proximal ends of two adjacent rollers is pivotally mounted between said vertical plates, and said beam interconnects said plates to said trestle.

5. A soil cultivating machine as claimed in claim 4, there are two upwardly extending beams arranged to have a triangular shape when viewed in plan, said trestle comprising coupling means on the front of said frame portion for attaching the machine to the three-point lift of a tractor, the apex of said beams being connected to the top of said trestle.

6. A soil cultivating machine as claimed in claim 2, wherein said roller means comprises a plurality of rollers that extend in a line transverse to the direction of travel, the proximal ends of adjacent rollers being supported by a single stub shaft and a corresponding supporting arm.

7. A soil cultivating machine as claimed in claim 1, wherein said roller means comprises a plurality of rollers positioned side-by-side in a line transverse to the direction of travel, the proximal ends of adjacent rollers being supported by a corresponding supporting arm of said arm means.

8. A soil cultivating machine as claimed in claim 7, wherein the supporting arms supporting the proximal ends of adjacent rollers are interconnected and each respective arm supports a separate stub shaft for at least one of said rollers.

9. A soil cultivating machine as claimed in claim 8, wherein each stub shaft is supported by two relatively spaced apart ball bearings in a respective supporting arm.

10. A soil cultivating machine as claimed in claim 7, wherein said rollers are supported on stub shafts by ball joints.

11. A soil cultivating machine for attachment to a prime mover having a multi-point hitch comprising a frame, including an upwardly extending coupling trestle at the forward side thereof and cultivating means supported on an elongated portion of said frame, elongated supporting roller means pivoted to said frame and positioned to the rear of said cultivating means, said roller means being a plurality of rollers mounted side-by-side, said rollers being interconnected to said frame by supporting parts comprising plates positioned at the rear of said frame portion, between the lateral ends thereof and further plates adjacent said lateral ends, upwardly and forwardly extending beams interconnecting said plate means to the upper portion of said trestle above said frame portion, said rollers being mounted on supporting arms and said arms extending rearwardly from pivot connections to said plates and further plates, said plates extending upwardly from said connections to mountings for said rollers.

* * * * *